(12) United States Patent
Fuehrer et al.

(10) Patent No.: US 7,269,488 B2
(45) Date of Patent: *Sep. 11, 2007

(54) METHOD FOR CONTROLLING A COMPONENT OF A DISTRIBUTED SAFETY-RELEVANT SYSTEM

(75) Inventors: Thomas Fuehrer, Gerlingen (DE); Bernd Mueller, Leonberg (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/276,603

(22) PCT Filed: Mar. 14, 2002

(86) PCT No.: PCT/DE02/00914

§ 371 (c)(1),
(2), (4) Date: Jun. 16, 2003

(87) PCT Pub. No.: WO02/075463

PCT Pub. Date: Sep. 26, 2002

(65) Prior Publication Data

US 2004/0030482 A1    Feb. 12, 2004

(30) Foreign Application Priority Data

Mar. 15, 2001  (DE) ................................ 101 12 914

(51) Int. Cl.
*G06F 19/00* (2006.01)

(52) U.S. Cl. ...................... 701/29; 701/70; 303/122.05

(58) Field of Classification Search .................. 701/29, 701/70, 45–48; 303/20, 122, 122.04, 122.05
See application file for complete search history.

(56) References Cited

U.S. PATENT DOCUMENTS

| | | | | |
|---|---|---|---|---|
| 5,880,568 A * | 3/1999 | Bederna et al. | ............. | 318/563 |
| 5,924,774 A * | 7/1999 | Cook et al. | .................... | 303/3 |
| 6,002,970 A | 12/1999 | Abdelnour et al. | | |
| 6,299,261 B1 * | 10/2001 | Weiberle et al. | .............. | 303/20 |
| 6,434,698 B1 * | 8/2002 | Maiolani et al. | ................ | 713/2 |
| 6,532,406 B1 * | 3/2003 | Schmedding et al. | ......... | 701/29 |

FOREIGN PATENT DOCUMENTS

| | | |
|---|---|---|
| DE | 44 38 714 | 5/1996 |
| DE | 197 16 197 | 10/1998 |
| DE | 197 17 686 | 10/1998 |
| DE | 198 29 126 | 5/1999 |

(Continued)

*Primary Examiner*—Gary Chin
(74) *Attorney, Agent, or Firm*—Kenyon & Kenyon LLP

(57) ABSTRACT

A method of triggering a component in a distributed safety-related system, i.e., a component of an X-by-wire system in a motor vehicle, is described. The component is triggered by a process computer assigned to the component and connected to a communication system via a communications controller. A monitoring unit which is independent of the process computer is provided for monitoring the process computer. To simplify the configuration of such a safety-related system while at the same time at least retaining the safety that is achievable on enabling the components, the functions of the monitoring unit are executed by the communications controller. The communications controller may execute a question-and-answer communication with the process computer.

16 Claims, 4 Drawing Sheets

FOREIGN PATENT DOCUMENTS

| | | |
|---|---|---|
| DE | 198 26 131 | 12/1999 |
| DE | 199 33 086 | 1/2001 |
| DE | 199 37 159 | 2/2001 |
| WO | WO 00 05116 | 2/2000 |
| WO | WO 01 14940 | 3/2001 |

* cited by examiner

METHOD FOR CONTROLLING A COMPONENT OF A DISTRIBUTED SAFETY-RELEVANT SYSTEM

FIELD OF THE INVENTION

The present invention relates to a method of triggering a component in a distributed safety-related system, i.e., a component of an X-by-wire system in a motor vehicle. The component is triggered by a process computer assigned to the component and connected to a communication system via a communications controller. A monitoring unit which is independent of the process computer is provided for monitoring the process computer.

The present invention also relates to a communications controller for connecting a process computer to a communication system, the process computer being used for triggering a component of a distributed safety-related system, i.e., a component of an X-by-wire system in a motor vehicle, and a communication protocol running on the communications controller to implement data transfer between the process computer and the communication system.

BACKGROUND INFORMATION

German Published Patent Application No. 198 26 131 discusses a distributed safety-related system as an electric brake system of a motor vehicle. Components of this system are configured as the brakes of the motor vehicle, i.e., more precisely, as actuators for triggering the brakes. Such a system is extremely safety-related, because faulty triggering of the components, i.e., faulty actuation of the brakes, may result in an unforeseeable safety risk. For this reason, the possibility of faulty triggering of the components must be ruled out reliably.

Features of the conventional brake system include a pedal module for central determination of the driver's intent, four wheel modules for wheel-individualized regulation of the brake actuators, and a processing module for calculating higher-level brake functions. Communication among individual modules may occur through a communication system. FIG. 2 of the present patent application shows the internal structure of a wheel module including various logic levels as an example. Logic level L1 includes at least the calculation of the control and regulating functions for the wheel brakes, while logic levels L2 through L4 include different functions for computer monitoring and function testing of L1.

Triggering of the brakes, i.e., the electric motors for actuating the brake shoes, includes the following steps for each wheel module equally:

a) Determining at least one triggering signal ($f\_1$) for the brake by a first microcomputer system ($R\_1A$) as a function of at least one input signal ($a\_R2, a\_R3, a\_R4$; $a\_V,ref$; $s\_R2, s\_R3, s\_R4$; $\Delta s\_V,ref$; $v\_F$; $n\_1$; $d\_1$; $F\_1i$; $a\_R1$; $s\_R1$). The input signals are made available to the microcomputer system ($R\_1A$) via a communication system ($K\_1$), e.g., a bus system.

b) Determining at least one logic triggering signal ($e\_1H$). The logic triggering signal ($e\_1H$) is determined at least partially by a monitoring unit ($R\_1B$), which is independent of the first microcomputer system ($R\_1A$), as a function of the at least one input signal.

c) Comparing the at least one triggering signal ($f\_1$) with the at least one logic triggering signal ($e\_1H$) in a power electronics unit ($LE\_1K$).

d) Determining at least one enabling signal (within the power electronics LE) as a function of the result of the comparison of the triggering signal ($f\_1$) and the logic triggering signal ($e\_1H$); and e) Relaying the at least one triggering signal ($f\_1$) or a signal ($i\_1K$) which depends on the triggering signal ($f\_1$) to the brake, i.e., to an actuator $Akt\_1$ for the brake shoes if the at least one enabling signal has a preselectable value.

The monitoring unit ($R\_1B$) detects systematic (common mode) faults. One example of such a fault is a fault in the power supply. With the conventional brake system, the monitoring unit ($R\_1B$) is configured as an independent microcomputer system. As an alternative, however, the monitoring unit ($R\_1B$) may also be configured as a hardware module without its own processor, so that it is capable of executing concrete logic functions or, if it includes a register, it may even execute switching functions. An example of such a hardware module is, for example, an ASIC (applied specific integrated circuit), an FPGA (field-programmable gate array) or a monitoring circuit (watchdog).

Other systems provide that logic level L4 is always implemented in a separate component, which must also be provided multiple times within the distributed safety-related system—e.g., in wheel modules of an electric brake system.

It is an object of the present invention to simplify the configuration of a distributed safety-related system while at the same time at least retaining the safety that is achievable on enabling the components.

To achieve this object, the present invention describes, starting with the method of the type defined in the preamble, that the functions of the monitoring unit be fulfilled by the communications controller.

SUMMARY OF THE INVENTION

The method according to the present invention may provide that a separate monitoring unit be omitted and that the functions of the monitoring instead be executed by such units of the distributed safety-related system that are provided in the system anyway. These units must have their own intelligence to be able to perform their own calculations, at least to a limited extent. The communications controller by which the process computer is connected to the communication system is suitable as such a system unit which, according to the present invention, may assume the functions of the monitoring unit.

It has now become standard for virtually all manufacturers to use communication systems in motor vehicles. Data may be transmitted over the communication system, e.g., according to the CAN protocol (controller area network), the TTCAN protocol (time triggered CAN), TTP/C (time triggered protocol for class C according to SAE), or the FlexRay protocol. These protocols may have a global time, i.e., a time base that is valid throughout the system. It plays an important role in the time control in communication (e.g., in time-controlled communication protocols) and in the application (e.g., in time-controlled operating systems), but also for diagnostic functions and fault recognition and/or fault handling. In other words, this means that each communications CONTROLLER of such a system includes its own clock (quartz), synchronized with all the other clocks in the system via the mechanism of global time. Due to these possibilities, the communications controller may be used for monitoring the microcomputer without any problem.

According to an exemplary embodiment of the present invention, it is described that a list of questions to be presented at preselectable points in time to the process computer to be monitored be made available to the communications controller, the process computer giving an answer to the communications controller and this answer is then analyzed by the latter.

This type of monitoring of a process computer is also referred as question-and-answer communication. The list may be stored in a memory element, i.e., a random-access memory, a read-only memory, or a flash memory. The questions are, for example, values including multiple bits which are processed by the process computer in a preselectable manner. This processing may range from an inversion of the question to a complex calculation including a memory test. The result of this processing is the process computer's answer to the question posed.

According to an exemplary embodiment of the present invention, it is described that the answer be checked for whether it was delivered within a preselectable period time. A timer is started as soon as question is supplied to the process computer. If the answer by the process computer does not fall within a time window defined by the starting point in time and the period of time, it is concluded that there is a fault in the process computer, and suitable countermeasures are initiated to prevent a safety-related situation.

As an alternative or in addition, it is described that the answer be checked for whether it is correct. To this end, the answer is checked for whether it is entered in a list as the correct answer to the question posed. The correct answers may be stored together with the corresponding questions in a memory element, i.e., a random-access memory, a read-only memory, or a flash memory of the communications controller.

According to an exemplary embodiment of the present invention, the questions are posed to the process computer by the communication controller periodically. As an alernative, the questions may also be presented randomly or according to a certain time pattern.

As a suitable countermeasure in the event of an incorrect answer and/or an answer outside of a preselectable period of time, the communications controller may assume the function of shutting down the process computer according to an exemplary embodiment of the present invention. As an alternative or in addition, the communications controller may assume the function of shutting down the component to be triggered.

As another implementation of the object of the present invention, it is described, starting with the communications controller of the type defined in the preamble, that the communication protocol be supplemented by mechanisms which make it possible for the communications controller to monitor the process computer. These mechanisms to be supplemented concern (periodically) posing questions, setting a timer for the time window to be monitored, monitoring the time window, and checking the answer from the process computer.

According to an exemplary embodiment of the present invention, the communication protocol may be supplemented by mechanisms for execution of the method according to the present invention.

Finally, it is described that the communications controller include a memory element, i.e., a random-access memory, a read-only memory or a flash memory, in which questions for the process computer and correct answers for a question-and-answer communication with the process computer are stored.

DETAILED DESCRIPTION

The method according to the present invention is explained in greater detail below on the basis of an electric brake system. However, the present invention is not limited to electric brake systems, but instead may be used for any distributed safety-related systems in which system components are triggered by process computers. The present invention allows reliable enabling of the components without the use of additional monitoring units to monitor the process computers. The functions of the monitoring units are instead assumed by the units of the safety-related system which are present in the system anyway, i.e., communications controllers by which the process computers are connected to a communication system.

For each vehicle wheel to be braked, the brake system includes a wheel module $R\_1$, $R\_m$. Each wheel module $R\_1$, $R\_m$ includes a microcomputer system $P\_1$, $P\_m$ and an enabling circuit $FS\_1$, $FS\_m$. Microcomputer systems $P\_1$, $P\_m$ each include a process computer $Pro\_1$, $Pro\_m$ and an intelligent communications controller $S\_1$, $S\_m$. Process computer $Pro\_1$, $Pro\_m$ and communications controller $S\_1$, $S\_m$ of a microcomputer system $P\_1$, $P\_m$ may be combined on a semiconductor module (called a chip); however, they are always configured as separate and independent units. Each wheel module $R\_1$, $R\_m$ is connected to a physical databus $K\_1$ via a communications controller $S\_1$, $S\_m$. Data is transmitted over the databus according to, for example, the TTCAN, TTP/C or FlexRay protocol. Wheel modules $R\_1$, $R\_m$ each control one actuator $Akt\_1$, $Akt\_m$ which includes one or more electric motors, for example, for actuation or release of the wheel brakes.

Figure 1:
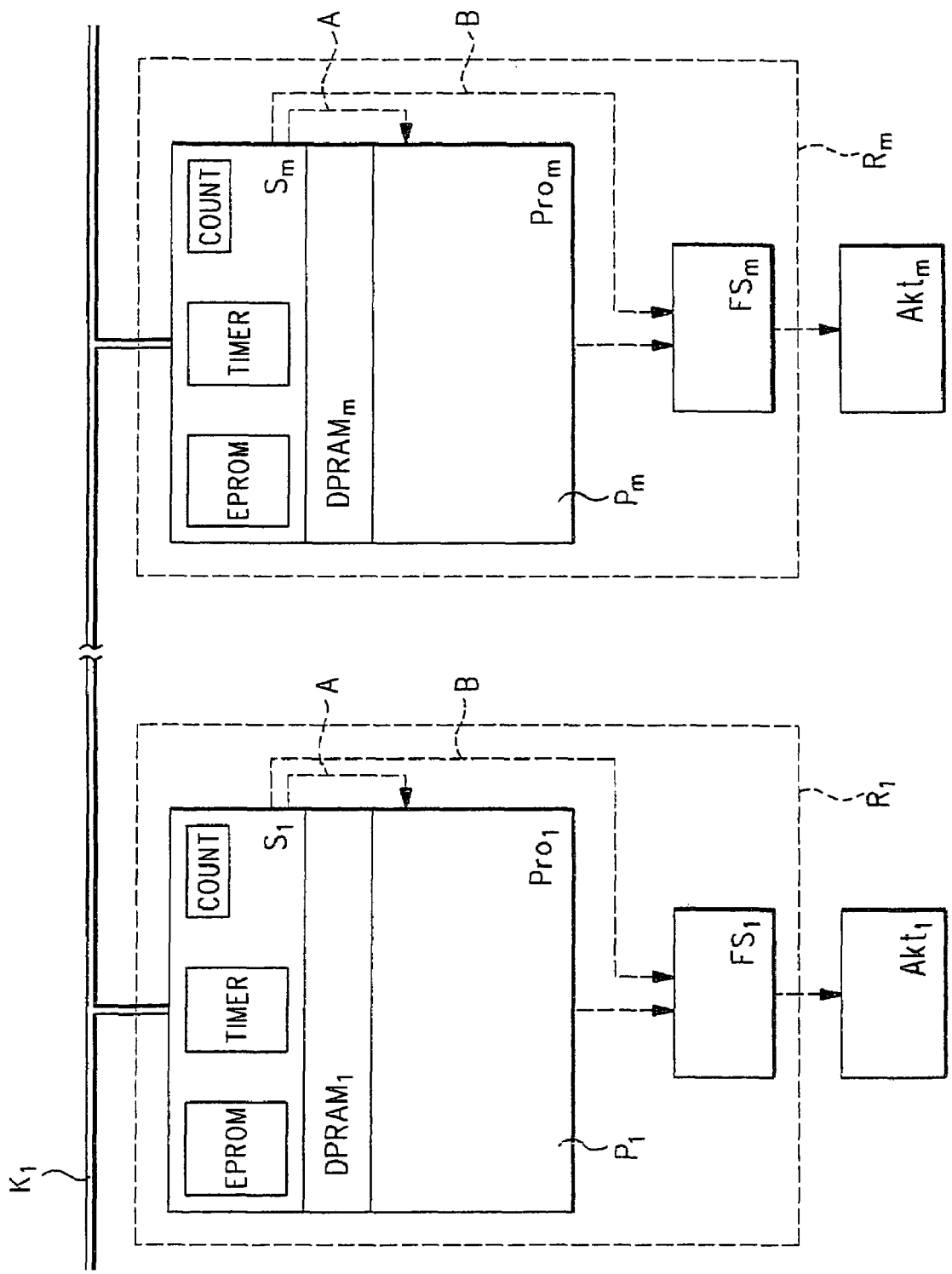
FIG. 1 shows a distributed safety-related system in a sectional view for implementation of a method according to the present invention in an exemplary embodiment.
Figure 2:
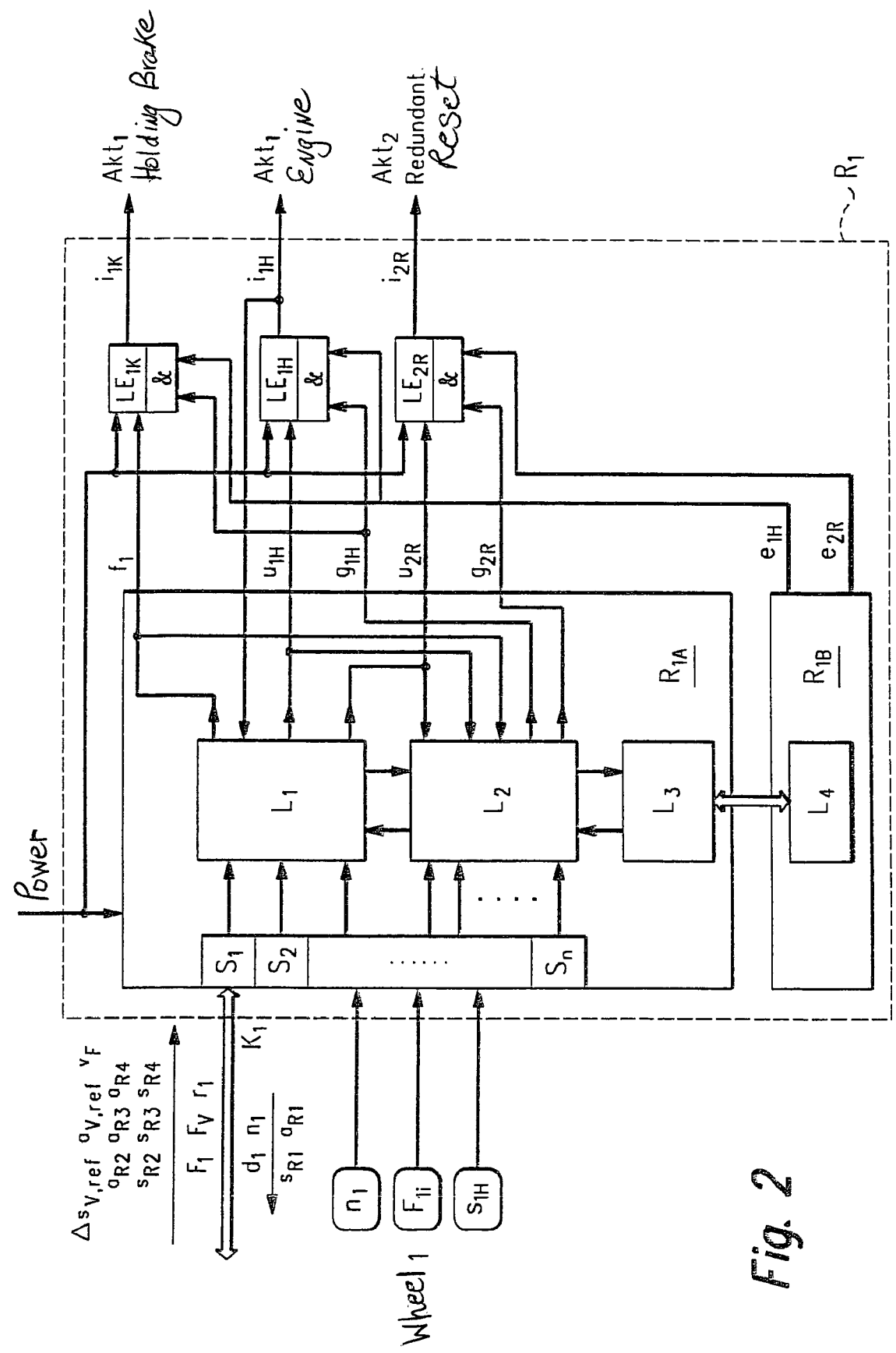
FIG. 2 shows a triggering module of other systems as part of a distributed safety-related system.

The monitoring concept of other systems (see FIG. 2) for checking on the process computer ($Pro\_1$) by a question-and-answer communication is replaced by the process computer-communications controller concept according to the present invention as illustrated in FIG. 1. Communications controller $S\_1$ assumes the function of monitoring unit $R\_1B$ from other systems and periodically poses questions to process computer $Pro\_1$ to obtain the correct answer within a preselectable time window. For the case when the answer fails to come within the time window or the correct answer to the question is not given, communications controller $S\_1$ assumes the function of shutting down process computer $Pro\_1$ (signal A) and/or shutting down connected component $Akt\_1$ via enabling circuit $FS\_1$ (signal B).

For implementation of the concept according to the present invention, communications controller $S\_1$ must merely be supplemented by mechanisms which permit periodic questioning, setting the corresponding timer for the time window, monitoring this time window, and checking the answer. Finally, communications controller $S\_1$ includes a pin (signal output A) for enabling process computer $Pro\_1$ and a pin (signal output B) for enabling the enabling circuit FS_1. These pins are operated by communications controller S_1.

Communication controller S_1 conducts a question-and-answer communication with process computer Pro_1, which is incorporated into the normal protocol operations (actual sending and receiving of messages, message confirmation, possibly membership service, and global time). This yields a slight increase in the load on communications controller S_1 but a significant improvement in the use of units within a distributed safety-related system. In addition, communications controller S_1 makes available software and hardware interfaces to permit connection to enabling circuit FS_1 and/or to a suitable pin of process computer Pro_1. Enabling circuit FS_1 is thus operated by process computer Pro_1 and also by communications controller S_1. In addition, process computer Pro_1 itself may be connected to communications controller S_1 so that process computer Pro_1 may be shut down itself, e.g., by connecting to a reset line of process computer Pro_1.

The process computer-communications controller concept according to the present invention for performing the question-and-answer communication may be implemented with any control unit equipped with a communications controller including an independent and autonomous clock. In the ideal case, this clock is synchronized with a global time of the entire distributed safety-related system by a clock synchronization mechanism. Communications controller S_1 must convert the mechanism of the question-and-answer communication and must have available the required configuration data and/or provide interfaces to process computer Pro_1 and to enabling circuit FS_1.

Communications controller S_1 must have the list of questions and the list of correct answers programmed in its permanent memory. A flash EPROM, for example, is especially suitable for this purpose; in most cases other configuration data for the actual communication is also stored there. The clock (timer) for setting the timeouts for the time window to be monitored must be configured in advance. When using a fault counter (count), the upper limit for the count must also be defined.

Communications controller S_1 offers a hardware interface which allows wiring of the resulting shutdown logic circuit from the question-and-answer communication with process computer Pro_1 (signal A) and with the additional enable circuit FS_1 (signal B).

The questions and answers are exchanged over a common memory area (dual port RAM) DPRAM_1 between process computer Pro_1 and communications controller S_1. This common memory area DPRAM_1 forms a software interface between communications controller S_1 and process computer Pro_1. For example, a 16-bit value is set in the software interface by communications controller S_1 (question) and the answer is read out by the software interface within the timeout. In addition, another software interface may also be available in communications controller S_1 to make the status of the question-and-answer communication available to the outside (e.g., "timeout exceeded" or "answer correct").

Communications controller S_1 must perform the analysis of the answer received by process computer Pro_1 and a comparison with the answers stored in the answer list. To do so, additional mechanisms are to be taken into account in the normal communication protocol to permit addressing of the table in which the answer list is stored and a comparison of two values. Furthermore, any fault counters (count) present may also be managed.

Figure 3:
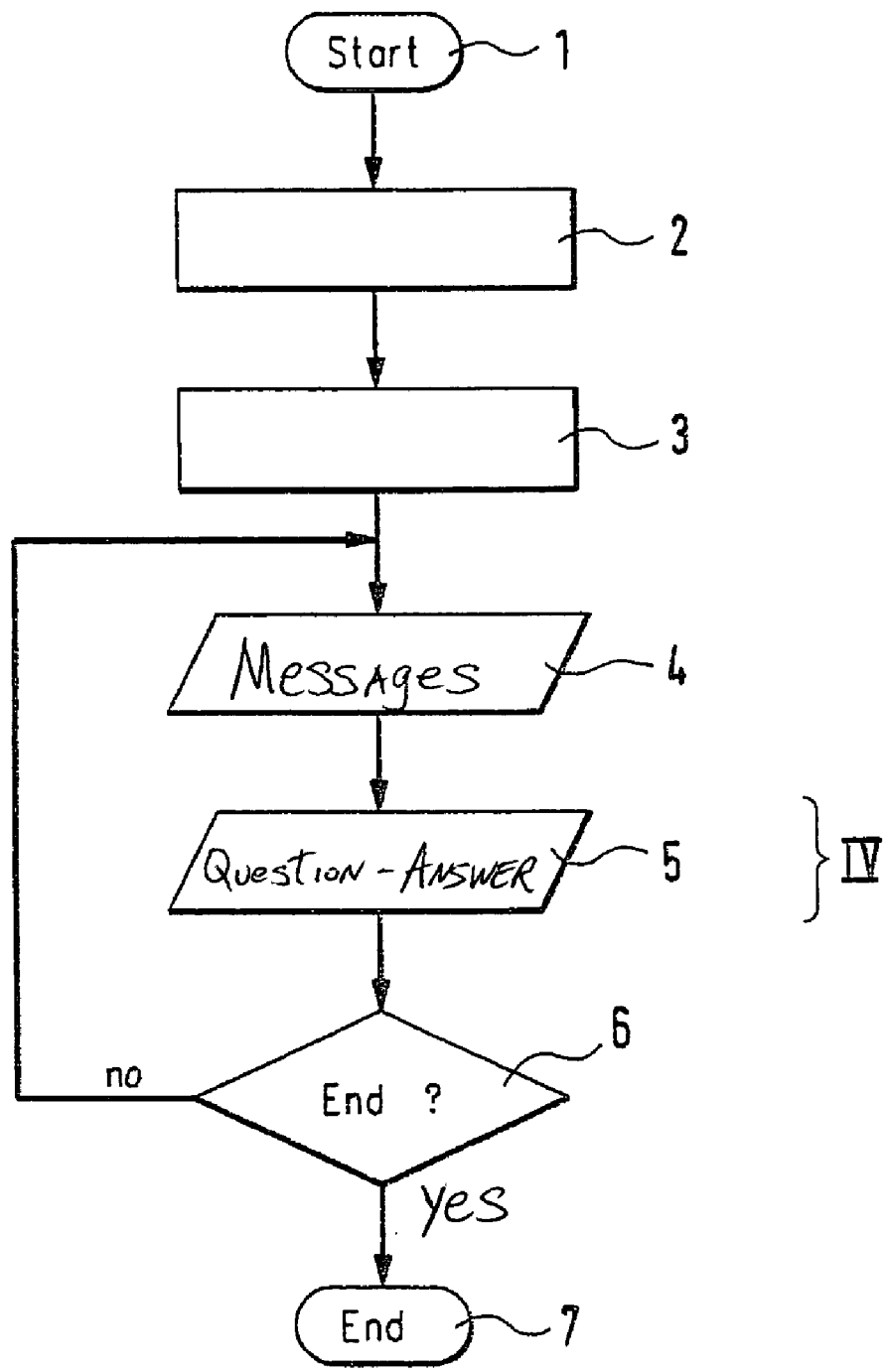
FIG. 3 shows a flow chart of a method according to the present invention in an exemplary embodiment.

The method according to the present invention is explained in detail below on the basis of FIGS. 3 and 4. This method begins in a function block 1. The initial situation is an active distributed network including functioning members (communications controllers S_1, S_m and their process computers Pro_1, Pro_m). There is no signal for shutting down process computer Pro_1 or component Akt_1 to be triggered (via enabling circuit FS_1).

A system start is executed in a function block 2. Then in a function block 3, communications controller S_1 and process computer Pro_1 are initialized. Then the normal application begins with sending and receiving messages (function block 4). In addition, communications controller S_1 also initiates the question-and-answer communication (function block 5). The two sequences which are represented only symbolically by function blocks 4 and 5 are routines which may be executed not only in succession but also concurrently, i.e., simultaneously or more or less in parallel. Question-and-answer routine 5 is shown in detail in FIG. 4 and explained in greater detail below.

In a query block 6, a check is performed to determine whether the method is to be terminated or not. The method is terminated, for example, when the corresponding member or the entire distributed system is being ramped down. If the method is not to be terminated, it branches off again to function block 4. Otherwise the method according to the present invention is terminated in a function block 7.

Figure 4:
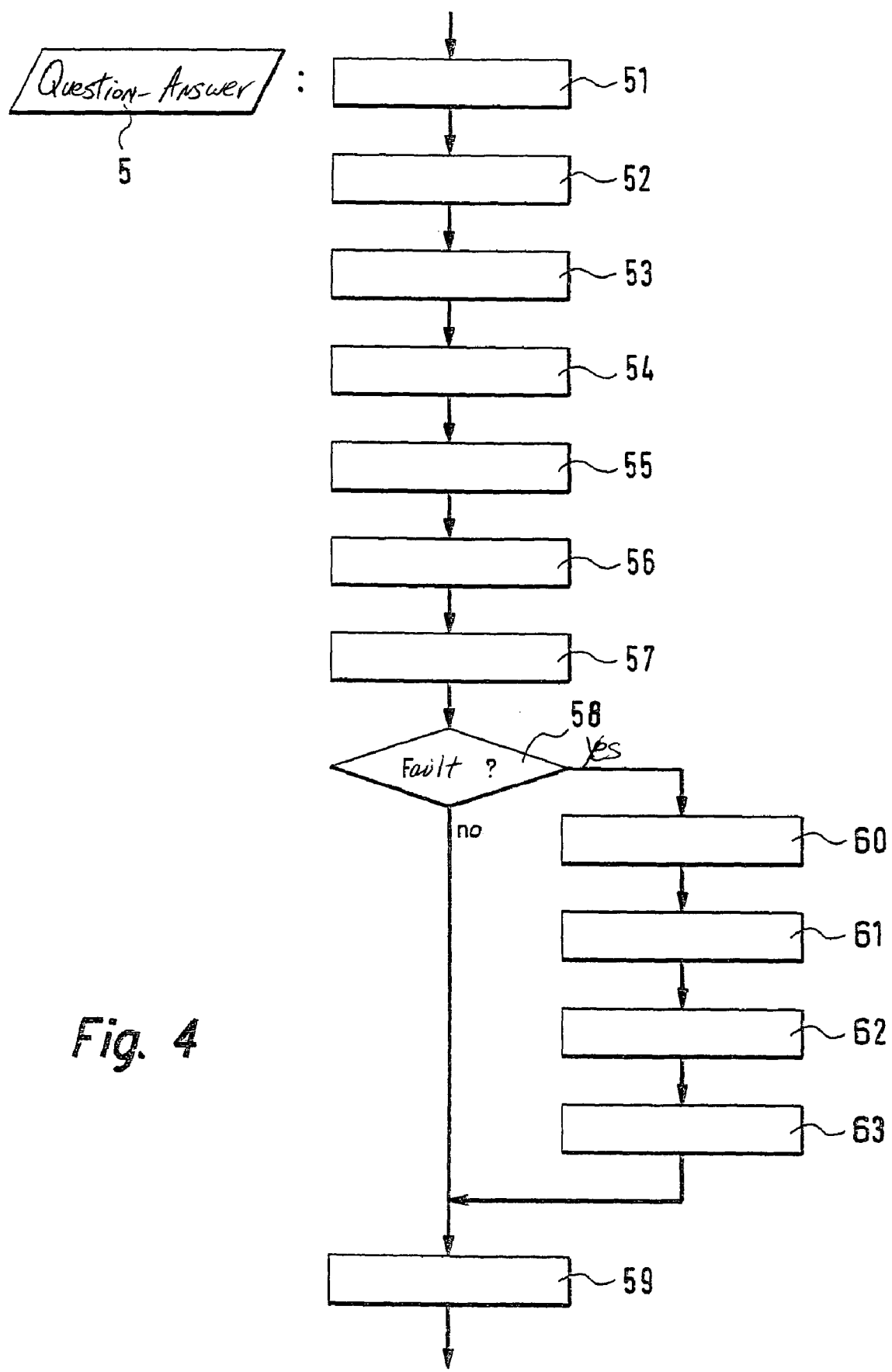
FIG. 4 shows a detail of the flow chart from FIG. 3 concerning a question-and-answer communication between a communications controller and a process computer.

FIG. 4 shows the question-and-answer routine from function block 5 in greater detail. In a function block 51, a certain question is selected from the catalog of questions stored in the EPROM memory element of communication interface S_1. The choice of question may involve cyclic processing or processing by a preselectable pattern or a random pattern (e.g., linked to the current system time of communications controller S_1). The selected question is then made available to process computer Pro_1 in a function block 52 via software interface DPRAM_1, and the timer is started in function block 53. Monitoring of the time window is part of the additional protocol sequence in communications controller S_1 and may also be triggered in different manners, e.g., by polling or by a capture-and-compare logic circuit in communications controller S_1.

Process computer Pro_1 contains suitable software which processes the question of communications controller S_1 (function block 54) and determines a corresponding answer to the question (function block 55). The algorithms and/or methods used for this are not the object of the present invention and may range from an inversion of the question to a complex calculation including a memory test. The software in process computer Pro_1 then gives the answer to communications controller S_1 via software interface DPRAM_1 in a function block 56.

Then in a function block 57, the answer is read out of software interface DPRAM_1 into communications controller S_1. In a function block 58, the answer given by process computer Pro_1 is compared with the correct answer entered into the answer list via an analyzer logic circuit of communications controller S_1. In the normal case, communications controller S_1 receives the correct answer (output "no"). The result of the question-and-answer communication is additionally set in a status register (function block 59), i.e., in this case a positive status. From here, question-and-answer routine 5 branches back to function block 6 in FIG. 3. The next question may then be posed to process computer Pro_1, e.g., after the time out, and then question-and-answer routine 5 is run through again. This results in a cyclic question-and-answer protocol. Initiation of the next question, however, may also occur at predetermined points in time (see also time-controlled communication protocols which make each protocol step dependent on reaching a certain point in time).

In the case of a fault (output "yes" from query block 58), the answer given by process computer Pro_1 will not match the corresponding correct answer to the question in the configured list of communications controller S_1 or it will not come within the defined time window.

As part of fault handling, first a fault counter is incremented (function block 60). Then in a function block 61, signal A for shutting down processor Pro_1 is triggered. In a function block 62, signal B for shutting down actuator Akt_1 may be sent via enabling circuit FS_1. Steps 61 and 62 may be processed with each fault handling operation. As an alternative, however, they may also be processed only when the fault count, which has been incremented in function block 60, has exceeded a preselectable limit value. Through steps 61 and 62, participation of shutdown units Pro_1 and Akt_1 in the communication is stopped until there is a proper system restart. In a function block 63, the end of the method according to the present invention is preselected so that the method ends in function block 7 after the next run-through of query block 6.

This invention claimed is:

1. A method of triggering a component in a distributed safety-related system, the distributed safety-related system being an X-by-wire system in a motor vehicle, comprising:
    triggering the component by a process computer assigned to the component and connected via a communications controller to a communication system, the process computer operating according to a first logic; and
    monitoring the process computer by the communications controller, wherein the communications controller operates according to an additional logic that verifies a performance of the process computer according to the first logic, wherein a plurality of questions to be presented at a plurality of preselected points in time to the process computer are made available to the communications controller, and wherein the process computer supplies corresponding answers to the communications controller for analysis. by the communications controller.

2. The method of claim 1, wherein each answer is checked for whether it was delivered within a preselected period of time.

3. The method of claim 1, wherein each answer is checked for whether it is correct.

4. The method of claim 3, wherein each answer is checked for whether it is entered in a list of correct answers as a correct answer to a corresponding question.

5. The method of claim 1, wherein the plurality of questions are presented to the process computer by the communications controller periodically.

6. The method of claim 1, wherein the communications controller shuts down the process computer when an answer is at least one of incorrect and is not delivered within a preselected period of time.

7. The method of claim 1, wherein the communications controller shuts down the component to be triggered when an answer is at least one of incorrect and is not delivered within a preselected period of time.

8. A system for triggering a component in a distributed safety-related system, the distributed safety-related system being an X-by-wire system in a motor vehicle, comprising:
    a process computer for triggering the component and operating according to a first logic;
    a communication system connected to the process computer; and
    a communications controller for connecting the process computer to the communication system, wherein a communication protocol is executed on the communications controller for implementation of a data transfer between the process computer and the communication system, and wherein the communication protocol is supplemented by a plurality of mechanisms that allow the communications controller to monitor the process computer, wherein the communications controller operates according to an additional logic that verifies a performance of the process computer according to the first logic, wherein a plurality of questions to be presented at a plurality of preselected points in time to the process computer are made available to the communications controller, and wherein the process computer supplies corresponding answers to the communications controller for analysis by the communications controller.

9. The system of claim 8, wherein each answer is checked for whether it was delivered within a preselected period of time.

10. The system of claim 8, wherein each answer is checked for whether it is correct.

11. The system of claim 10, wherein each answer is checked for whether it is entered in a list of correct answers as a correct answer to a corresponding question.

12. The system of claim 8, wherein the plurality of questions are presented to the process computer by the communications controller periodically.

13. The system of claim 8, wherein the communications controller shuts down the process computer when an answer is at least one of incorrect and is not delivered within a preselected period of time.

14. The system of claim 8, wherein the communications controller shuts down the component to be triggered when an answer is at least one of incorrect and is not delivered within a preselected period of time.

15. The system of claim 8, wherein the communications controller includes a memory that stores the plurality of questions for the process computer and a list of correct answers for a question-and-answer communication with the process computer.

16. The system of claim 15, wherein the memory includes one of a random-access memory, a read-only memory, and a flash memory.

* * * * *